3,051,591
QUICK DRYING VEHICLE AND METHOD
Benjamin L. Sites, Elmhurst, and Meyer S. Agruss, Chicago, Ill., assignors to Miehle-Goss Dexter, Inc., Chicago, Ill., a corporation of Delaware
No Drawing. Filed July 23, 1958, Ser. No. 750,312
16 Claims. (Cl. 117—93)

This invention relates to the art of coating materials. It has particular reference to an improved quck-drying vehicle of the drying oil type for various coatings, and to an improved method for rapidly indurating or drying such a vehicle after the coating operation.

A flow-diagram of the method is as follows:

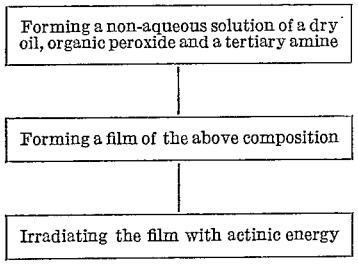

The invention is applicable generally to coating materials utilizing a drying oil type of vehicle, where quick-drying of the vehicle is desired. The term coating materials is intended to cover such vehicles or materials which embrace the characteristics of the subject invention and which may have applications in fields other than those specifically mentioned herein, such as, for example, photosensitive resists for use in the graphic arts, plugging materials for use in the drilling operations encountered in the petroleum industries, and the like. However, for illustrative purposes, and with no intent to limit its field of use, the invention will be described with particular reference to printing, wherein the coat-forming material is applied by a conventional printing plate.

Printing inks as made heretofore generally consist mainly of a non-aqueous vehicle, namely a drying oil, pigmented to the desired color. For some purposes the printing ink does not contain a pigment, for example, in over-printing. The drying oils commonly used for printing inks, such as tung oil, linseed oil, rape seed oil, and castor oil, have by nature a drying rate which is slow compared to the potential operating speeds of printing presses, even when the usual driers (e.g. cobalt) are added to the oils. Particularly with the advent of the higher speed presses and multiple color printing, the avoidance of smudges and off-set on the successive sheets coming from the printing press has presented a serious problem.

While numerous attempts have been made to solve this problem, none of them, as far as we are aware, can be regarded as satisfactory. For example, the use of heat-set inks and steam-set inks, which were developed for this purpose, require the addition of large and expensive accessory equipment to the printing press in order to utilize the full productivity of the press; and the heat or steam tend to impair the dimensional stability of the paper and therefore the quality of the finished printed matter. The use of fine powder sprays or a transparent protective coating over the freshly printed surface (see Costello Patent No. 2,696,168, dated December 7, 1954) also requires considerable accessory equipment and is generally inconvenient.

It has also been proposed to increase the drying rate of printing inks by employing a catalyst or polymerization promoter for speeding up the drying of the vehicle, sometimes in conjunction with heat or radiation of certain light energy. These proposals likewise involve objectionable features which have barred or greatly limited their commercial use. For example, a printing ink containing a diacyl peroxide as the catalyst will undergo skinning and livering even after a short period of storage under ordinary conditions, due to the strong oxidizing effect of this peroxide on the eleostearin of the drying oil, as disclosed in Hooft Patent No. 2,109,774 dated March 1, 1938. Thus, Hooft proposed to apply the diacyl peroxide to the paper separately from the ink, which entails obvious disadvantages in commercial printing. Wendt Patents Nos. 2,453,769 and 2,453,770 disclose printing inks containing certain methane derivatives for promoting polymerization of the drying oil, and irradiation of the printed material with ultra violet light of certain wave lengths; but this expedient is admittedly unsuitable when a heat bodied tung oil is used as the vehicle, and the use of pure eleostearin as suggested by Wendt will obviously result in an unstable product having too short a shelf line for commercial purposes.

The principal object of the present invention is to provide a quick-drying vehicle of the drying oil type and a method for rapidly indurating or drying such a vehicle. Another object is to provide a quick-drying printing ink and printing method which enable the printing press to operate at maximum speed with no smudging or off-setting on the successively printed sheets, and without impairing the dimensional stability of the paper. Further objects are to provide a quick-drying ink containing a polymerization promoter activated by ultra-violet light, or other forms of actinic energy, and to provide an ink of this character which is stable in that it can be stored for a long period of time under ordinary conditions without livering. (While we have referred in the above to sheet-fed presses, it will be understood that the invention is also applicable to web-fed presses.)

By a vehicle of the "drying oil type" we mean a vehicle containing a drying oil binder having a conjugated system of double bonds. By "quick-drying" we mean that when the vehicle containing the ink pigment or other material is applied in a thin film (about 2 to 4 microns in thickness) as in printing, it will dry or set in a matter of seconds; that is, the surface of the film when irradiated for ultra-violet light, becomes sufficiently dry so that in the case of a printing ink, for example, it will not off-set on succeeding sheets coming from the press. However, the drying action does not stop after the ultra-violet light or activating energy is removed. On the contrary, in the practice of the present invention we have found that within about 10–30 seconds after such removal of the activating energy, the polymerization or drying action has penetrated the entire film to provide a film which is hard throughout. On the other hand, a film of the same thickness consisting of the vehicle alone, when irradiated for the same period of time with the ultra-violet light, will dry throughout the entire depth of the film in this short period of irradiation, there being no inert pigment in the vehicle to slow down the polymerization rate.

We have discovered that a non-aqueous vehicle having a binder of the type heretofore described can be made quick-drying and yet retain good shelf-life by incorporating in the vehicle a small amount of a soluble organic peroxide and a tertiary amine. The peroxide appears to function as a catalyst or polymerization promoter and brings about the rapid induration of the binder upon exposure to actinic energy radiation, when a film or coating of same is irradiated with actinic energy, such as ultra-violet light. A possible explanation is that the peroxide constitutes an activating means for triggering a reaction in which the peroxide catalyst readily absorbs ultra-violet light to form free radicals and thus initiate the polymerization of the binder of the vehicle. This provides a rapid reaction which completes the polymerization or drying of the coating or film of the vehicle in a matter of seconds.

However, a peroxide alone in the presence of the binder results in livering and skinning and therefore is unsatisfactory from the standpoint of shelf-life. Thus, an exceptionally good catalyst is restricted in its use to the inconvenient and cumbersome methods described by Hooft.

By incorporating a tertiary amine in the binder-peroxide mass, a stable product that retains the quick-drying characteristics of the binder-peroxide combination and yet will not liver or skin, is obtained. In addition, conventional driers such as cobalt, lead and manganese naphthenates, octoates and linoleates, may be incorporated without any deleterious effect on storage stability. This was surprising since it had been our experience that the incorporation of cobalt driers in the drying oil-peroxide system aggravated the livering and skinning problem.

Organic peroxides (this term includes hydroperoxides), in general, are satisfactory. For example, mono and diacyl and alkyl peroxides have been found satisfactory. Since, generally, the solubility of the peroxide decreases with an increase in molecular weight, it is preferred that the peroxide chosen contain no more than eight carbon atoms in each carbon group attached to the —O—O— radical.

Examples of diacyl peroxides are benzoyl, methyl ethyl ketone, lauroyl, myristoyl, 2,4-dichloro benzyl and acetyl.

Hydroperoxides such as di-isopropyl-benzene hydroperoxide, cumene hydroperoxide, phenylcyclohexane hydroperoxide and tertiary butyl hydroperoxide have been found suitable.

Among the satisfactory monoacyl and alkyl peroxides are 2,2-bis (tertiary butyl peroxy) butane, di-tertiary butyl peroxide, tertiary butyl peracetate and tertiary butyl perbenzoate.

Tertiary amines from the aliphatic, aromatic and heterocyclic group have been used successfully, e.g., N, N-dimethyl aniline, triethylamine, triamylamine and N-methyl morpholine.

The binder may be any of the drying oils commonly used in printing inks and containing conjugated unsaturation, or a mixture of two or more such oils. Bodied tung oil is preferred as the conjugatedly unsaturated drying oil. As indicated above, however, the binder may comprise a conjugatedly unsaturated drying oil, such as, tung oil and a portion of non-conjugatedly unsaturated drying oil. If the binder contains less than about 30% conjugated unsaturation, the vehicle will not undergo the rapid and complete polymerization which is preferred for the purpose of the invention.

The proportions of the peroxide and drying oil or other binder in the vehicle are not critical, but we have found that good results are obtained if the peroxide is present in an amount which is roughly 2–4% by weight of the binder.

The proportion of tertiary amine may vary from 2 to 15%, 4 to 8% having been found to be especially suitable.

The ultra-violet light used to trigger the polymerization reaction is preferably a full spectrum of ultra-violet, including 1800 A. to 4000 A., as we have found that isolated bands of the spectrum do not provide as rapid a polymerization as the full spectrum. An example of such a light source is a high pressure electronic discharge quartz mercury arc tube having an active length of about 1½ inches and drawing about 100 watts, the ultra-violet intensity of radiations of 3130 A. and shorter, measured at 20 inches distance, being over 250 microwatts per square centimeter.

The method of the invention comprises essentially the rapid induration of the drying oil or other binder by (1) forming a non-aqueous solution of the binder, peroxide and amine, (2) forming a film of the resulting vehicle, and (3) irradiating the film with actinic energy (preferably ultra-violet light) adapted to activate the peroxide catalyst.

In the preferred practice of the invention, the vehicle containing a pigment in the desired proportion is applied in any suitable manner as a film to the material to be coated such as a paper, and is then irradiated with ultra-violet light to trigger the polymerization reaction.

In the case of printing, the printing ink comprises the vehicle and if desired pigment suspended in the vehicle. The ink is applied in the usual manner by the printing press, and the source of ultra-violet light is positioned to irradiate the printed surfaces of the successive sheets coming from the press.

In the following examples, shown in Table I, a few drops of the vehicle in each case were placed upon a glass microscope slide and spread out to a thin film with an accurately honed steel depth gage, so that the thickness of the various films was substantially uniform for comparative purposes; and in each case, the thin film on glass was placed one inch away from the ultra-violet source previously described and timed for complete polymerization to take place. The number of seconds required for the vehicle to polymerize or dry to a hard film, starting with the inception of the irradiation, is given for each vehicle. For comparative purposes, it was found that a similar film of bodied tung oil by itself required 95 seconds of similar irradiation before polymerizing to a hard film.

*Table I*

| Vehicle Composition | Elapsed Time Without Livering, Mos. | Seconds to Dry |
|---|---|---|
| 81% Bodied Tung Oil, 15% N,N-Dimethyl Aniline, 4% Benzoyl Peroxide | 9 | 30 |
| 81% Bodied Tung Oil, 15% Triethylamine, 4% Benzoyl Peroxide | 9 | 20 |
| 81% Bodied Tung Oil, 15% Triamylamine, 4% Benzoyl Peroxide | 9 | 20 |
| 81% Bodied Tung Oil, 15% n-Methyl Morpholine, 4% Benzoyl Peroxide | 9 | 5 |
| 57% Bodied Tung Oil, 30% Methyl Methacrylate, 8% N-Methyl Morpholine, 4% Benzoyl Peroxide, 1% Cobalt Naphthenate (6%) | 9 | 5 |

The following Table II gives similar data for various tertiary amines in combination with different types of peroxides in bodied tung oil, the vehicle in each case consisting of 92% bodied tung oil, 4% of the tertiary amine and 4% of the peroxide, by weight:

*Table II*

| Peroxide | N,N-Dimethyl Aniline | Triethyl Amine | Triamyl Amine | N-Methyl Morpholine | Remarks |
|---|---|---|---|---|---|
| Benzoyl Peroxide | Seconds 30 | Seconds 15 | Seconds 12 | Seconds 5 | No skin after 2 weeks |
| Methyl-ethyl Ketone-Peroxide | 22 | 16 | 30 | 18 | Do. |
| t-Butyl Perbenzoate | 9 | 10 | | 6 | Do. |
| t-Butyl Hydro-Peroxide | 30 | 18 | | 24 | Do. |

The significance of the present invention, as regards shelf-life of the vehicle, is shown by the fact that a vehicle consisting of 96% bodied tung oil and 4% benzoyl peroxide will liver within a period of only one day. Thus, by incorporating a tertiary amine in the vehicle composition, not only does a film of the vehicle dry rapidly under the aforesaid irradiation, due to the catalytic action of the peroxide, but also the vehicle has a good shelf-life despite the presence of the peroxide.

As will be apparent from the above tables, vehicles in which the peroxide is combined with N-methyl morpholine will generally afford the most rapid drying when irradiated. However, while the latter tertiary amine is the preferred one, the invention is not limited thereto, as the other tertiary amines provide obviously desirable results.

We claim:

1. A stable non-aqueous quick-drying vehicle for coating materials, which comprises a drying oil having a conjugated system of double bonds, an oil-soluble organic peroxide present in an amount of at least 2% by weight of the total weight, and a tertiary amine, said drying oil, peroxide and tertiary amine being in substantially unreacted form and adapted to quickly dry when exposed in thin film to actinic energy.

2. A vehicle according to claim 1, in which the drying oil has a conjugated unsaturation of at least about 30%.

3. A vehicle according to claim 1, in which the organic peroxide is present in an amount in the order of 2–4% by weight of the drying oil.

4. A non-aqueous quick-drying vehicle according to claim 1, in which said amine is N-methyl morpholine.

5. A stable quick-drying printing ink comprising a drying oil having a conjugated system of double bonds, a pigment suspended in the drying oil, an oil soluble organic peroxide present in an amount of at least 2% by weight of the total weight and a tertiary amine, said drying oil, peroxide and tertiary amine being in substantially unreacted form and adapted to quickly dry when exposed in thin film to actinic energy.

6. A printing ink according to claim 5, in which the drying oil has a conjugated unsaturation of at least about 30%.

7. A method of rapidity indurating a drying oil having a conjugated system of double bonds, which comprises forming a non-aqueous, stable solution of said drying oil, an oil soluble organic peroxide present in an amount of at least 2% by weight of the total weight and a tertiary amine, forming a film of said solution, and irradiating said film with actinic energy.

8. A method according to claim 7, in which said actinic energy is ultra-violet light.

9. A method according to claim 7, in which said actinic energy is the full spectrum of ultra-violet light.

10. A method according to claim 7, in which said drying oil has a conjugated unsaturation of at least about 30%.

11. A method according to claim 7, in which said amine is N-methyl morpholine.

12. In the art of printing a sheet, the improvement which comprises forming a non-aqueous, stable solution of a drying oil, a soluble organic peroxide present in an amount of at least 2% by weight of the total weight and a tertiary amine, the drying oil having a conjugated system of double bonds, said solution containing a pigment in suspension to form an ink, printing the sheet with said ink, and irradiating the printed surface of the sheet with actinic energy, thereby rapidly indurating the ink.

13. The improvement according to claim 12, in which said drying oil has a conjugated unsaturation of at least about 30%.

14. The improvement according to claim 12, in which said actinic energy is ultra-violet light.

15. The improvement according to claim 12, in which said actinic energy is the full spectrum of ultra-violet light.

16. The improvement according to claim 12, in which said amine is N-methyl morpholine.

References Cited in the file of this patent

UNITED STATES PATENTS

| | | |
|---|---|---|
| 1,818,073 | Long | Aug. 11, 1931 |
| 2,109,774 | Hooft | Mar. 1, 1938 |
| 2,322,106 | Auer | June 15, 1943 |
| 2,407,861 | Wolk | Sept. 17, 1946 |
| 2,453,770 | Wendt | Nov. 16, 1948 |
| 2,480,928 | Hurcks | Sept. 6, 1949 |
| 2,633,425 | Thompson | Mar. 31, 1953 |
| 2,893,937 | Dow | July 7, 1959 |
| 2,939,795 | Lecompte | June 7, 1960 |

OTHER REFERENCES

Mattiello: "Protective and Decorative Coatings," vol. IV, p. 231, John Wiley & Sons, Inc., 1944.

UNITED STATES PATENT OFFICE
CERTIFICATE OF CORRECTION

Patent No. 3,051,591                 August 28, 1962

Benjamin L. Sites et al.

It is hereby certified that error appears in the above numbered patent requiring correction and that the said Letters Patent should read as corrected below.

Column 1, in the flow-diagram, line 1 of the first box, for "dry" read -- drying --; line 33, for "graphic arts" read -- Graphic Arts --; column 2, line 44, before "ultra-violet" insert -- about 1-3 seconds with the actinic energy, preferably --; line 56, for "throughout" read -- through --; column 4, Table I, first column, line 7 thereof, for "n-methyl" read -- N-methyl --; column 5, line 44, for "rapidity" read -- rapidly --.

Signed and sealed this 18th day of December 1962.

(SEAL)
Attest:

ERNEST W. SWIDER
Attesting Officer

DAVID L. LADD
Commissioner of Patents